(12) United States Patent
Karpman et al.

(10) Patent No.: US 9,925,838 B2
(45) Date of Patent: Mar. 27, 2018

(54) BALL JOINT ASSEMBLY FOR A CONTROL ARM

(71) Applicant: Federal-Mogul Motorparts Corporation, Southfield, MI (US)

(72) Inventors: Alexander Karpman, Ballwin, MO (US); Thomas Byrnes, St. Charles, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 381 days.

(21) Appl. No.: 14/637,707

(22) Filed: Mar. 4, 2015

(65) Prior Publication Data
US 2015/0251512 A1    Sep. 10, 2015

Related U.S. Application Data

(60) Provisional application No. 61/947,576, filed on Mar. 4, 2014.

(51) Int. Cl.
*B60G 7/00* (2006.01)
*F16C 11/06* (2006.01)
(Continued)

(52) U.S. Cl.
CPC ............ *B60G 7/005* (2013.01); *F16C 11/068* (2013.01); *F16C 11/0614* (2013.01);
(Continued)

(58) Field of Classification Search
CPC ..... Y10T 403/32639; Y10T 403/32681; Y10T 403/32704; Y10T 403/32729;
(Continued)

(56) References Cited

U.S. PATENT DOCUMENTS 1,065,483 A    6/1913    Turner
2,047,885 A    7/1936    Riebe
(Continued)

FOREIGN PATENT DOCUMENTS

EP    2 631 501    *    8/2013    ............ F16C 23/04
GB        494050    *   10/1938    ............ B60G 7/00
(Continued)

OTHER PUBLICATIONS

International Search Report, dated May 8, 2015 (PCT/US2015/018687).

*Primary Examiner* — Michael P Ferguson
(74) *Attorney, Agent, or Firm* — Robert L. Stearns; Dicksinson Wright, PLLC

(57) ABSTRACT

The ball joint assembly includes a housing which extends along an axis and a bearing. The bearing has an opening that extends between opposite axial ends and presents a curved bearing surface. A stud with an inner bore is positioned in the bearing and has an outer surface which is in sliding contact with the bearing surface to allow the bearing and housing to rotate relative to the stud. The assembly further includes a fastener which is receivable within the inner bore for connecting the stud with a frame of a vehicle. The fastener includes an internal passage which extends from an end of the fastener to a side surface of the fastener, and the stud has a channel which extends from the inner bore to the outer surface for allowing lubrication of the ball joint assembly while the ball joint assembly is installed in the vehicle suspension system.

11 Claims, 9 Drawing Sheets

(51) Int. Cl.
*F16C 11/02* (2006.01)
*F16C 33/10* (2006.01)

(52) U.S. Cl.
CPC ........ *B60G 2204/416* (2013.01); *F16C 11/02* (2013.01); *F16C 11/0685* (2013.01); *F16C 11/0695* (2013.01); *F16C 33/102* (2013.01); *F16C 2326/05* (2013.01); *Y10T 29/49643* (2015.01); *Y10T 403/32631* (2015.01)

(58) Field of Classification Search
CPC .... B60G 7/005; F16C 11/068; F16C 11/0685; F16C 11/0604; F16C 11/0609; F16C 11/0614; F16C 11/0666; F16C 11/0671
See application file for complete search history.

(56) References Cited

U.S. PATENT DOCUMENTS

| | | | |
|---|---|---|---|
| 2,309,281 A * | 1/1943 | Steele | F16C 11/0614 384/206 |
| 2,345,564 A | 4/1944 | Allen | |
| 2,478,660 A | 8/1949 | Keahey | |
| 2,971,787 A | 2/1961 | Lincoln | |
| 3,160,449 A | 12/1964 | Scott | |
| 3,243,212 A | 3/1966 | May | |
| 3,371,398 A | 3/1968 | Patterson et al. | |
| 3,379,464 A * | 4/1968 | Bradshaw | B66C 23/605 212/253 |
| 3,441,299 A * | 4/1969 | Pfaar | B62D 7/16 280/93.511 |
| 3,803,685 A * | 4/1974 | Muhn | B23P 15/003 29/898.044 |
| 3,822,100 A * | 7/1974 | Reinsma | F16C 11/0614 403/134 |
| 3,831,245 A | 8/1974 | Amos | |
| 3,965,554 A | 6/1976 | Amos | |
| 4,411,545 A | 10/1983 | Roberge | |
| 4,765,757 A | 8/1988 | Halt | |
| 4,840,498 A | 6/1989 | Lichtfuss | |
| 4,979,844 A | 12/1990 | Teramachi | |
| 5,070,609 A | 12/1991 | Teramachi | |
| 5,265,965 A | 11/1993 | Harris et al. | |
| 5,372,373 A * | 12/1994 | Reel | B60G 7/02 280/124.111 |
| 5,482,379 A | 1/1996 | Harris et al. | |
| 5,951,195 A | 9/1999 | Ruholl | |
| 6,520,682 B2 | 2/2003 | Kletzli et al. | |
| 6,988,830 B2 | 1/2006 | Maasch et al. | |
| 7,223,019 B2 | 5/2007 | Hoppe | |
| 7,568,841 B2 | 8/2009 | Wood, Jr. et al. | |
| 8,337,087 B2 | 12/2012 | Blachon | |
| 2008/0089627 A1 | 4/2008 | Yamamoto et al. | |
| 2009/0080818 A1 | 3/2009 | Sasaki et al. | |
| 2012/0177437 A1 | 7/2012 | Bongartz et al. | |
| 2013/0294816 A1 | 11/2013 | Broeker et al. | |

FOREIGN PATENT DOCUMENTS

| | | | |
|---|---|---|---|
| GB | 1185717 A | 3/1970 | |
| JP | H02114223 U | 9/1990 | |
| JP | 9-177786 | * 7/1997 | ............. F16C 23/04 |
| WO | WO 81/01621 | * 6/1981 | ............. F16C 11/06 |
| WO | 2013184221 A1 | 12/2013 | |

* cited by examiner

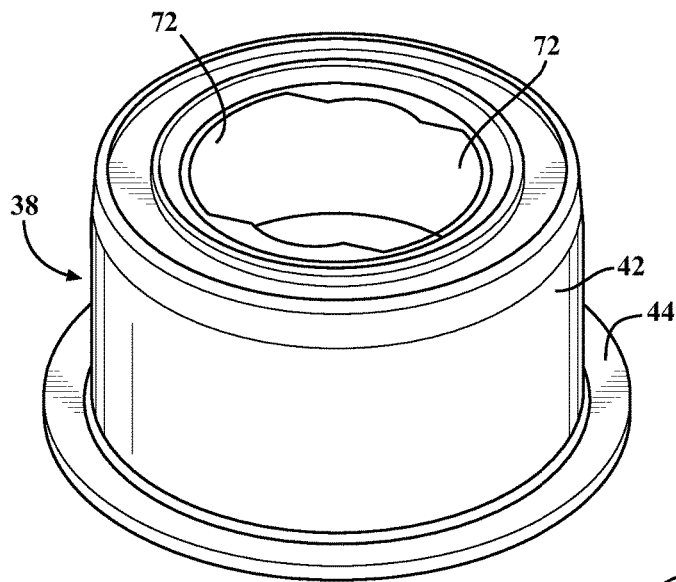
FIG. 8
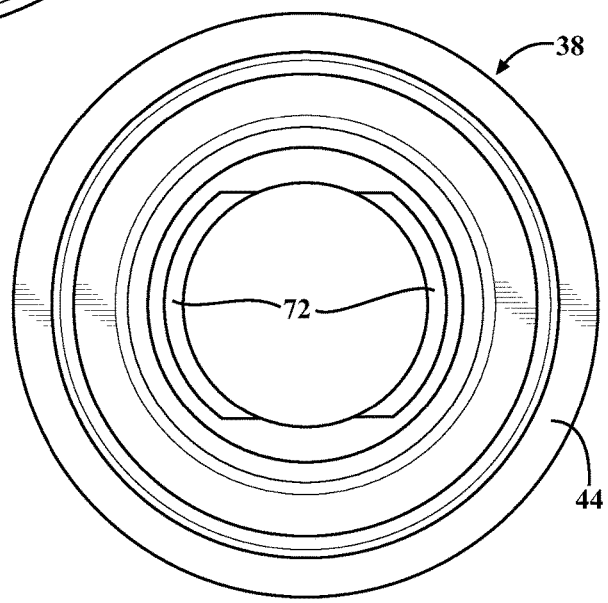
FIG. 9
FIG. 10
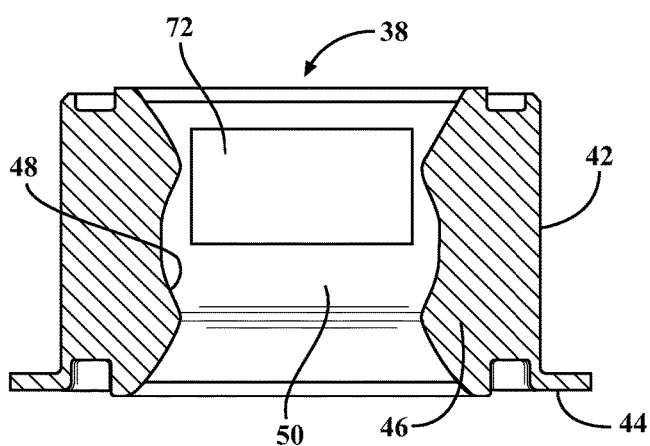

BALL JOINT ASSEMBLY FOR A CONTROL ARM

CROSS-REFERENCE TO RELATED APPLICATION

This application claims the benefit of U.S. Provisional Patent Application Ser. No. 61/947,576, filed Mar. 4, 2014, entitled "Bushing Assembly", the entire disclosure of the application being considered part of the disclosure of this application and hereby incorporated by reference.

BACKGROUND OF THE INVENTION

1. Field of the Invention

The present invention is related generally to bushing and ball joint assemblies and more particularly to assemblies having a stud and a housing which is rotatable relative to the stud.

2. Related Art

Many automotive vehicles today employ suspension systems commonly known as MacPherson strut systems or double-wishbone systems. Such systems typically include a lower control arm (also referred to as an A-arm) which pivots relative to the vehicle's frame to allow a wheel and tire to move upwardly and downwardly relative to the frame during cornering or in response to encountering an object, such as a pot hole in the road.

A lower control arm 10 for a Macpherson strut type of suspension system is generally shown in FIG. 1. The lower control arm 10 includes a ball joint 12 for connection with a steering knuckle (not shown) of a hub assembly and a pair of bushings 14, 16 for guiding the pivoting movement of the lower control arm 10 relative to the vehicle's frame (not shown). One of the bushings is a horizontal bushing 14 which is configured to pivot relative to the vehicle frame about longitudinally extending bolt (not shown). The other bushing 16 is a vertical bushing which is configured to pivot relative to the vehicle frame about a vertically extending bolt (not shown).

Referring now to FIGS. 2A-C, an conventional vertical bushing 16 is generally shown. As best shown in FIG. 2C, the conventional vertical bushing 16 has an outer metallic sleeve 18, which is press fit into an opening in the lower control arm 10 (shown in FIG. 1), a rubber cushion 20 and an inner metallic sleeve 22. The rubber cushion 20 extends radially between and interconnects the outer and inner metallic sleeves 18, 22. In operation, the inner metallic sleeve 22 pivots or twists relative to the outer metallic sleeve 18 during movement of the vehicle suspension, such as when the vehicle encounters a pot hole in the road. The rubber cushion 20 deforms elastically to allow the pivoting movement between these sleeves 18, 22 and absorbs/deforms due to a radial load. As such, during operation of the vehicle, the rubber cushion 20 is exposed to both a radial load and a twisting load motion. Exposure to the radial load and twisting motion leads to deterioration in the rubber cushion 20, thereby reducing the life of the vertical bushing 16.

SUMMARY OF THE INVENTION AND ADVANTAGES

An aspect of the present invention provides for a ball joint assembly for a control arm of a vehicle system. The ball joint assembly includes a housing which extends along an axis and a bearing. The bearing has an opening that extends between opposite axial ends and presents a curved bearing surface. A stud is positioned within the opening of the bearing and has a curved outer surface which is in sliding contact with the curved bearing surface of the bearing to allow the bearing and housing to rotate relative to the stud. The stud has an inner bore which extends between opposite axial ends of the stud. The assembly further includes a fastener which is receivable within the inner bore of the stud for connecting the stud with a frame of a vehicle. The fastener includes an internal passage which extends from an end of the fastener to a side surface of the fastener, and the stud has a channel which extends from the inner bore to the outer surface for allowing lubrication of the ball joint assembly while the ball joint assembly is installed in the vehicle suspension system. That is, the ball joint offers improved performance and durability as compared to the vertical bushing of known control arm assemblies and also allows for servicing (re-lubrication) without disassembling the vehicle suspension system in any way.

Another aspect of the present invention provides for a method of making a ball joint assembly for a control arm of a vehicle suspension. The method includes the step of inserting a stud ball with a truncated top and a truncated bottom into a cavity of a bearing. The method proceeds with the step of rotating the stud ball within the cavity of the bearing to establish sliding contact between an outer surface of the stud ball and a curved bearing surface of the bearing. The method continues further with the step of engaging sleeves with the truncated top and truncated bottom of the stud ball after the stud ball has been rotated within the cavity of the bearing. This process is may be accomplished at low cost and results in a ball joint with improved performance and durability as compared to vertical bushings of other known control arm assemblies.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 8 is an isometric view of a housing of the ball joint assembly of FIG. 4;

FIG. 9 is a top elevation view of the housing of FIG. 8;

FIG. 10 is a cross-sectional view of the housing of FIG. 8;

DETAILED DESCRIPTION OF THE EXEMPLARY EMBODIMENT

Figure 3:
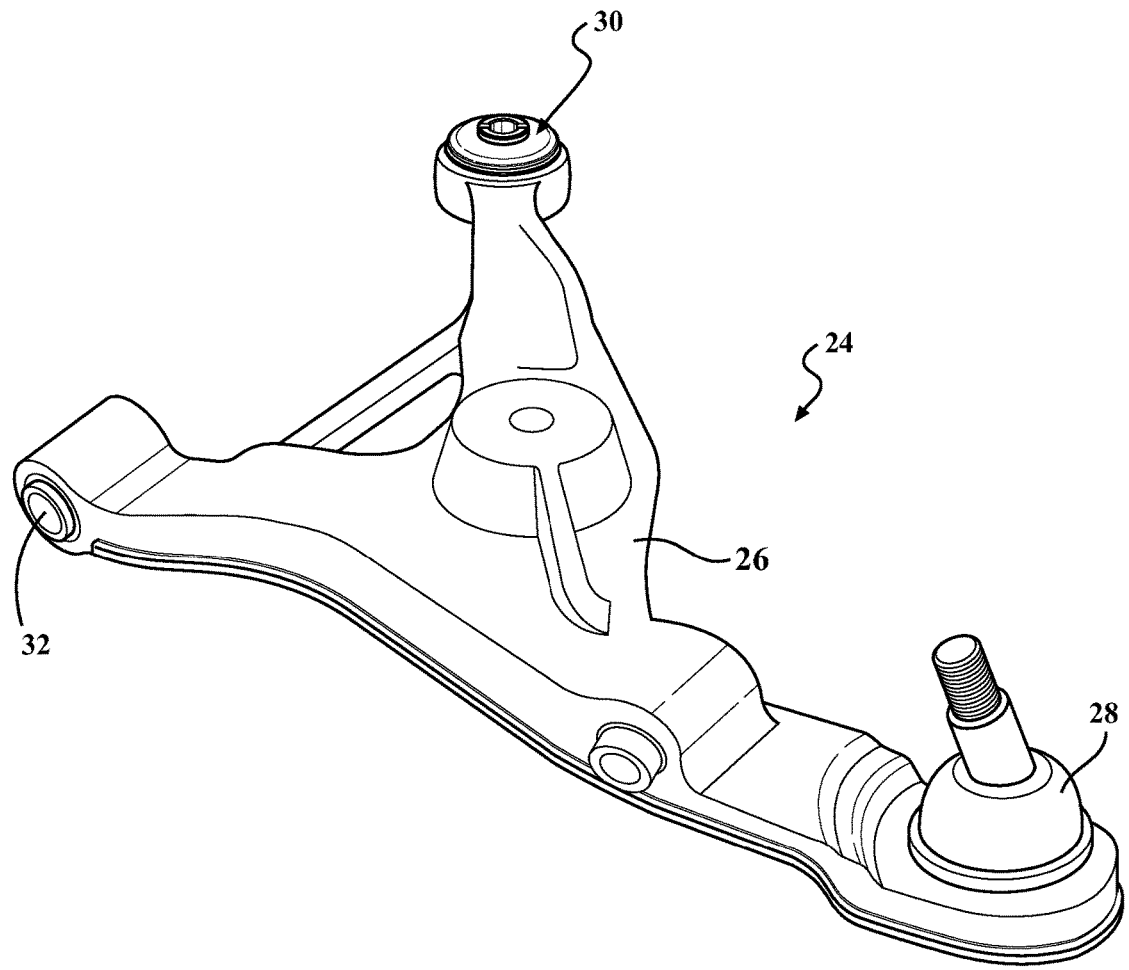
FIG. 3 is an isometric view of a control arm assembly constructed according to one aspect of the present invention.
Figure 4:
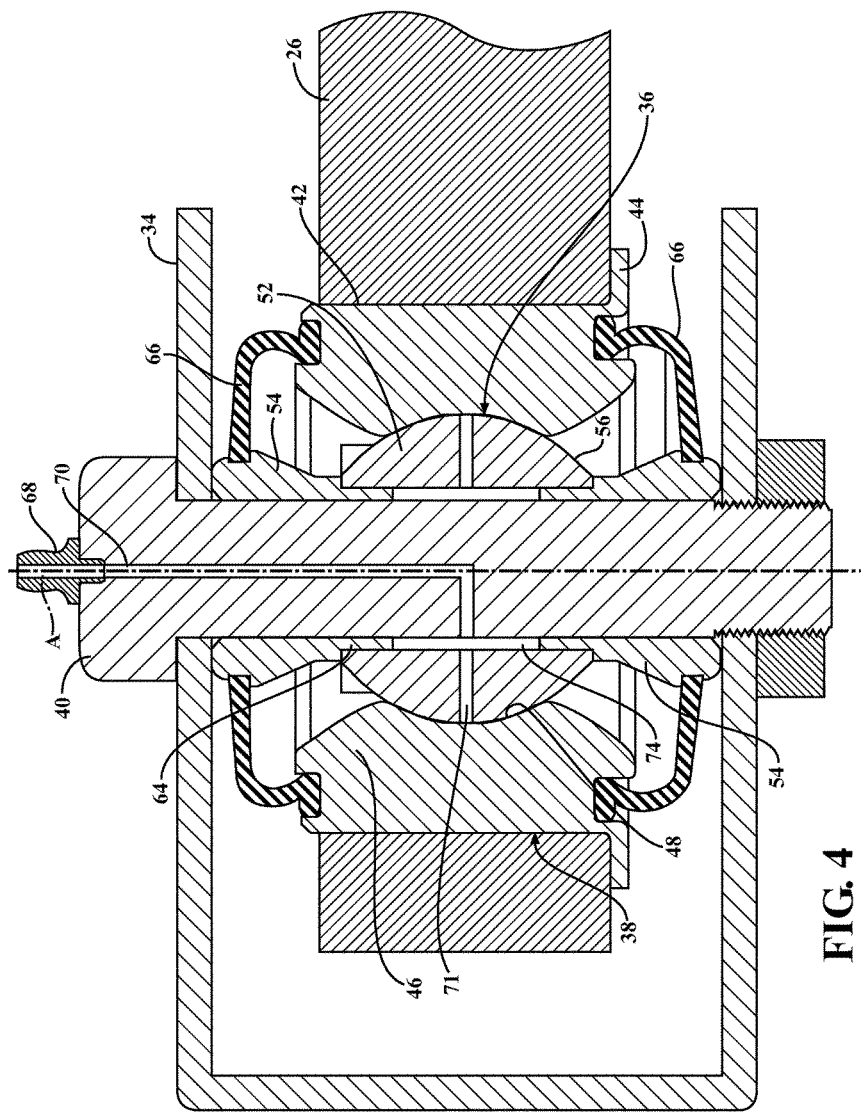
FIG. 4 is a cross-sectional view of a ball joint assembly of the control arm assembly of FIG. 3 installed in a control arm body.
Figure 5:
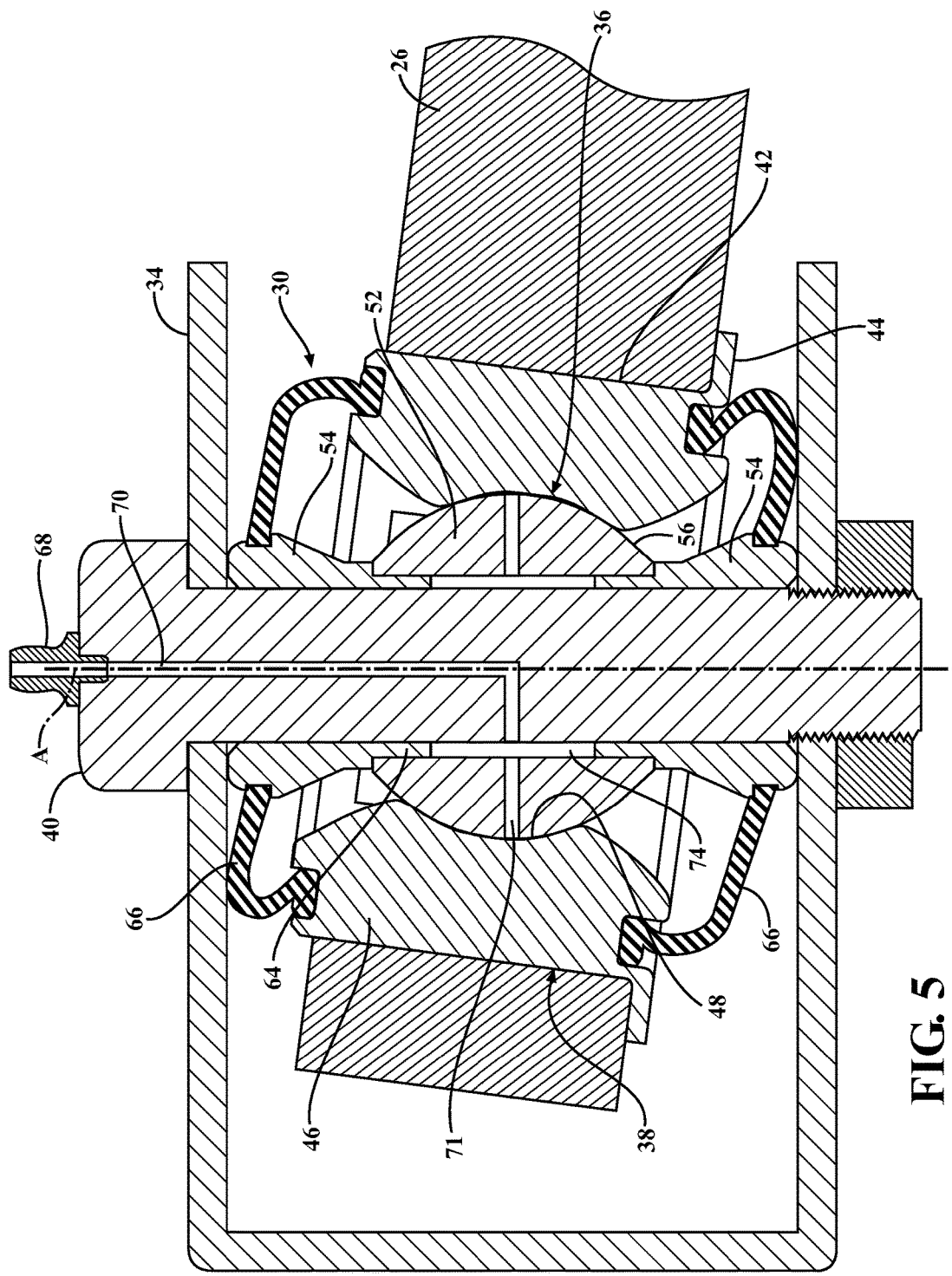
FIG. 5 is a cross-sectional view of the ball joint assembly of FIG. 4 in one pivoting position.
Figure 6:
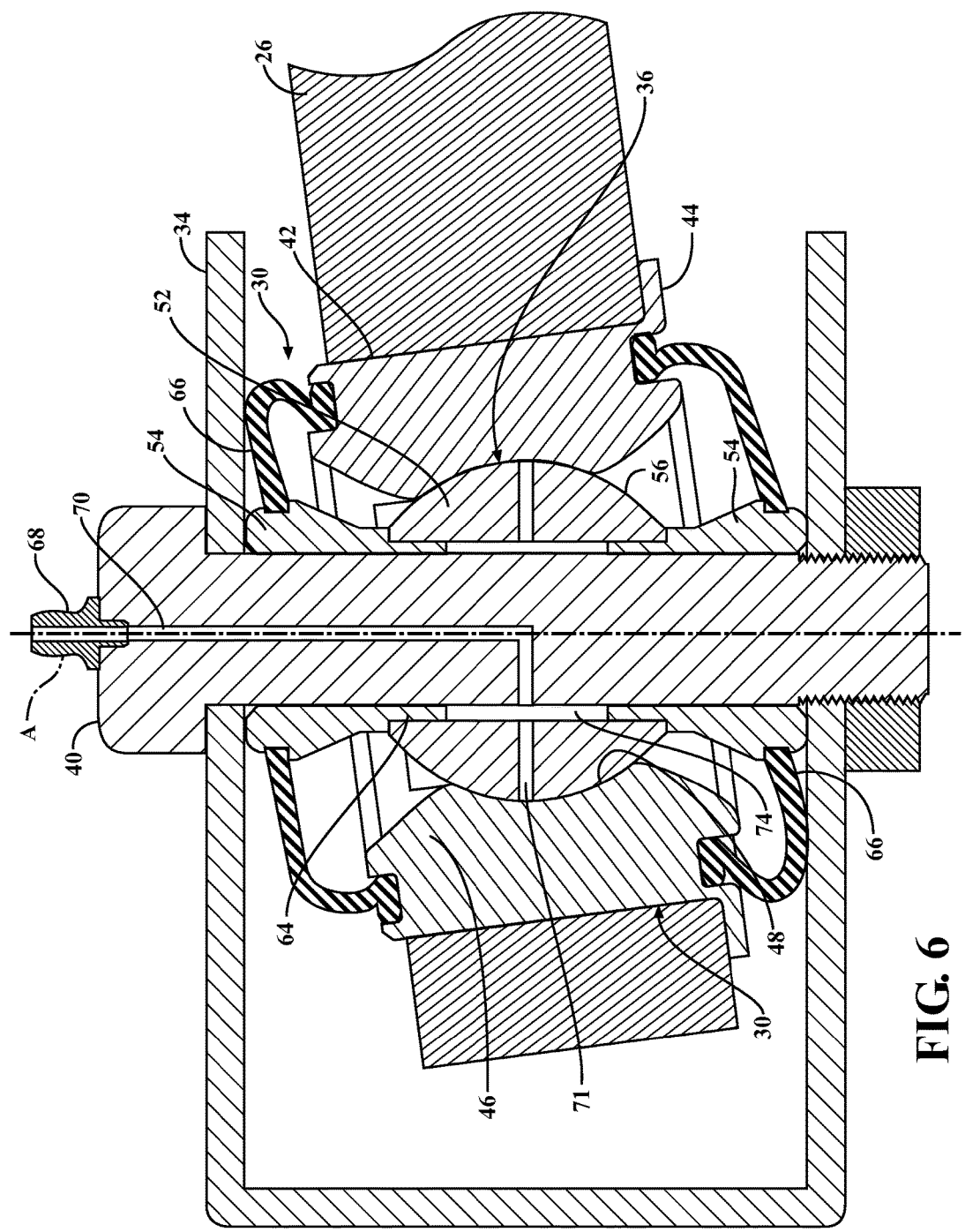
FIG. 6 is a cross-sectional view of the ball joint assembly of FIG. 4 in a different pivoting position from FIG. 5.

Referring to FIG. 3, an exemplary embodiment of a control arm assembly 24 constructed according to one aspect of the present invention for a vehicle suspension system is generally shown. The control arm assembly 24 includes a body 26 and a ball socket assembly 28 for attachment with a steering knuckle (not shown) of a vehicle. The control arm assembly 24 further includes a vertical ball joint assembly 30 and a horizontal bushing 32 which are configured to join the control arm body 26 with a vehicle frame 34 (shown in FIGS. 4-6). As shown in FIGS. 4-6, the ball joint assembly 30 allows the control arm body 26 to pivot relative to the vehicle frame 34 during operation of the vehicle, for example, in response to a wheel on the vehicle encountering an obstacle such as a pothole or in response to the vehicle rolling while cornering at high speeds. FIG. 5 shows the control arm body 26 in one pivoting position, and FIG. 6 shows the control arm body 26 in another pivoting position. The ball joint assembly 30 includes a stud 36 which is fixed to the vehicle frame 34 with a fastener and a housing 38 which is engaged with the control arm body 26 and which is pivotable relative to the stud 36. In the exemplary embodiment, the fastener which fixes the stud 36 with the vehicle frame 34 is a bolt 40 and nut combination.

As shown in FIG. 4, the housing 38 of the exemplary embodiment has an exterior surface 42 which extends along an axis A and is shaped and sized to be press-fit into an opening of the control arm body 26. One axial end of the exterior surface 42 includes a radially outwardly extending flange 44. During installation of the ball joint assembly 30 into the control arm body 26, the flange 44 defines a stopping point to ensure that the ball joint assembly 30 is properly installed in the opening of the control arm body 26. The housing 38 is preferably made of one integral piece of metal, such as steel.

The ball joint assembly 30 further includes a bearing 46 which establishes the pivoting relationship between the housing 38 and the stud 36. In the exemplary embodiment, the bearing 46 and the housing 38 are formed as one integral piece of metal. However, it should be appreciated that the bearing 46 and the housing 38 could alternately be constructed as separate elements which are formed separately and are subsequently joined together through any suitable process.

As shown in FIG. 10, the bearing 46 has an inner surface which extends axially between opposite open first and second ends. A portion of the inner surface defines a curved bearing surface 48, which is curved with a generally constant diameter to present a generally spherically-shaped cavity (hereinafter referred to as the "spherical cavity 50"). As such, the curved bearing surface 48 is generally semi-spherical in shape.

Figure 7:
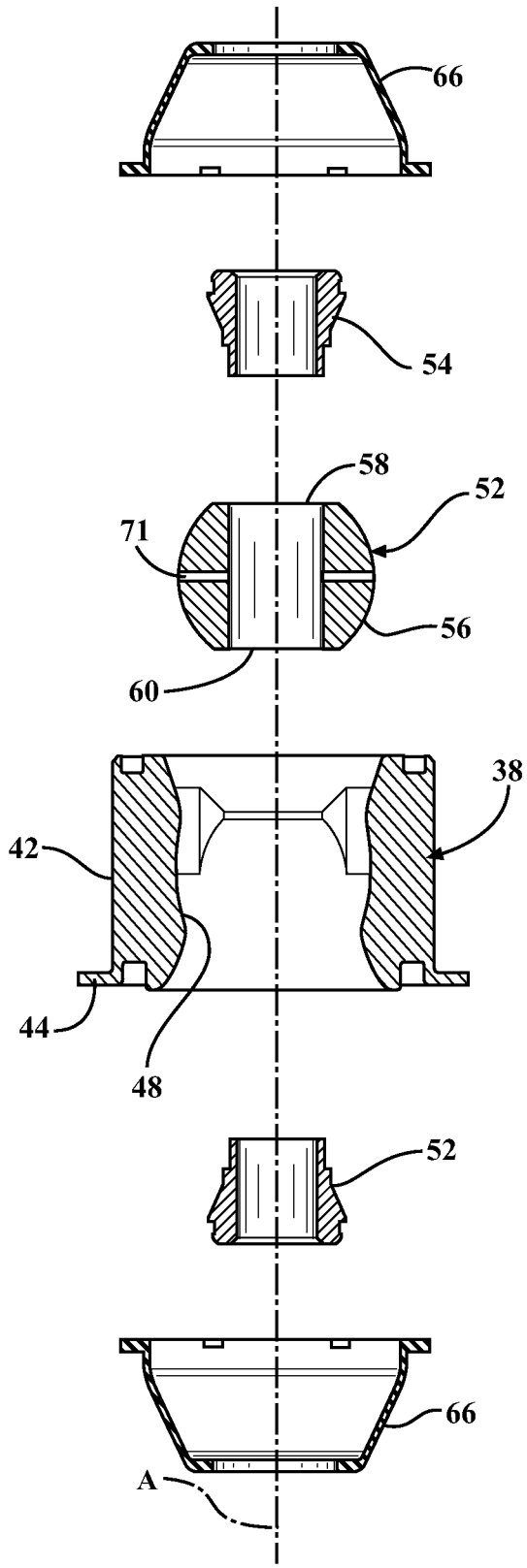
FIG. 7 is an exploded view of the ball joint assembly of FIG. 4.
Figure 11:
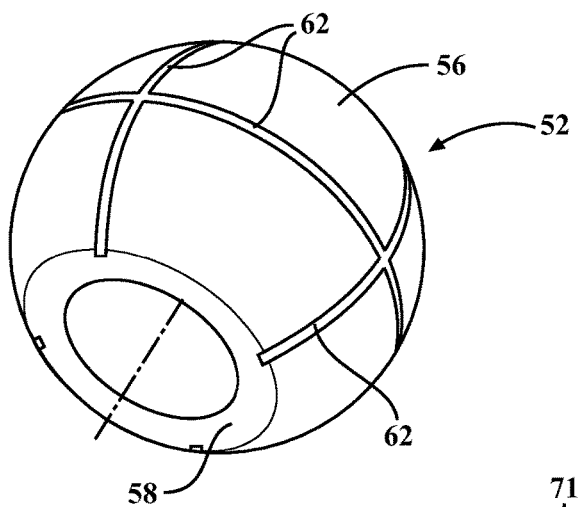
FIG. 11 is an isometric view of a stud ball of the ball joint assembly of FIG. 4.
Figure 12:
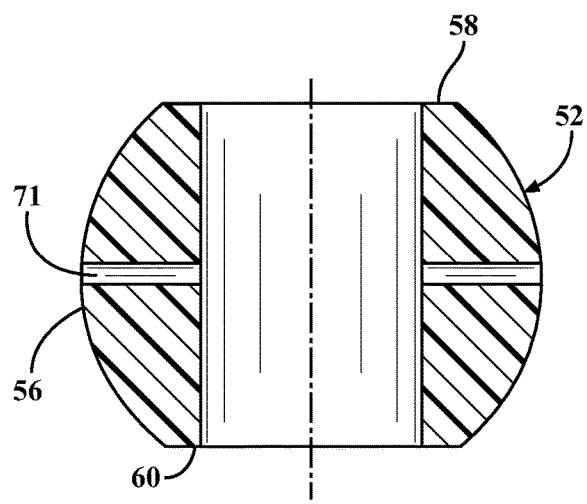
FIG. 12 is a cross-sectional view of the stud ball of FIG. 11.

Referring now to FIG. 7, the stud 36 of the exemplary embodiment is divided into three distinct pieces which are joined together in an axial direction. Specifically, the stud includes a single stud ball 52 and a pair of sleeves 54, which are of similar shape. The sleeves 54 are secured with the stud ball 52 on opposite axial sides of the stud ball 52. Referring additionally to FIGS. 11 and 12 the exemplary stud ball 52 has a generally curved or semi-spherically shaped outer surface 56, a truncated top 58 and a truncated bottom 60. The curvature of the outer surface 56 matches the curvature of the curved bearing surface 48 of the bearing 46 (shown in FIG. 10) to allow the stud ball 52 and housing 38 to slidably engage and rotate relative to one another. The stud ball 52 also includes a plurality of grooves 62 which run along the curved outer surface for distributing a lubricant, such as grease, along the outer surface 56 of the stud ball 52 to reduce friction between the stud ball 52 and the curved bearing surface 48 during rotation of the housing 38 and bearing 46 relative to the stud 36. In the exemplary embodiment, the stud ball 52 has one circumferentially extending groove 62 and a pair of generally axially extending grooves 62. The stud ball 52 is preferably made of metal and may be made through any suitable process.

Referring back to FIG. 4, the sleeves 54 are configured to engage with the stud ball 52 in an axial direction and to project through the opposite open ends of the housing 38. In the exemplary embodiment, the sleeves 54 are made of a metal and are configured to engage with the stud ball 52 through a press fitting operation. Specifically, the stud ball 52 has a through passage which receives a protrusion 64 on each of the sleeves 54 to establish a press fitting connection between the stud ball 52 and the sleeves 54. However, it should be appreciated that the stud ball 52 and sleeves 54 could be connected through any suitable means including, for example, threading, snap-fitting, etc. Making the stud sleeves 54 separate from the stud ball 52 may allow for reduced costs and more simplified assembly of the ball joint assembly 30 as discussed in further detail below.

Referring still to FIG. 4, a pair of boots 66 of an elastomeric material, such as rubber, are sealed against the housing 38 and the sleeves 54 of the stud 36. The dust boot 66 serves the dual functions of keeping dust and other debris out of the interior of the ball joint assembly 30 and also keeping the lubricant from escaping out of the interior of the ball joint assembly 30.

Figure 1:
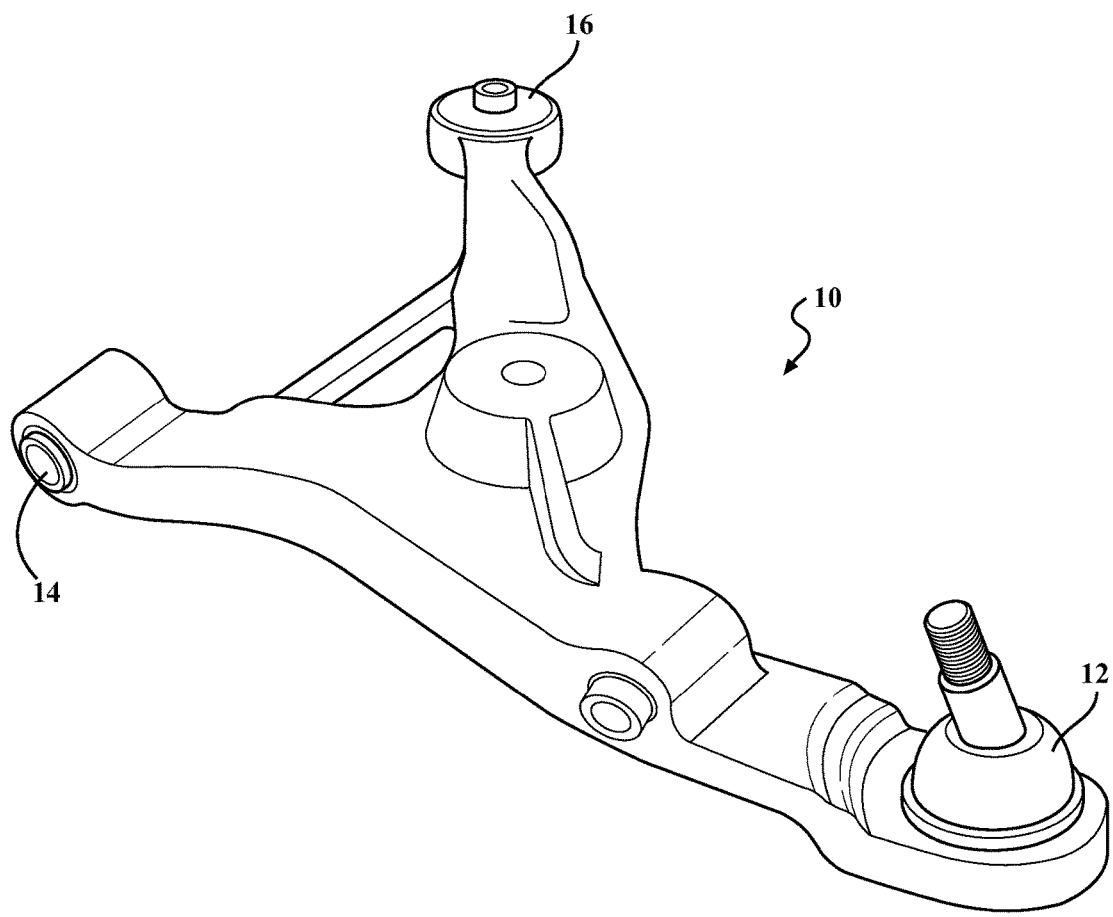
FIG. 1 is an isometric view of a known control arm assembly.
Figure 2A:
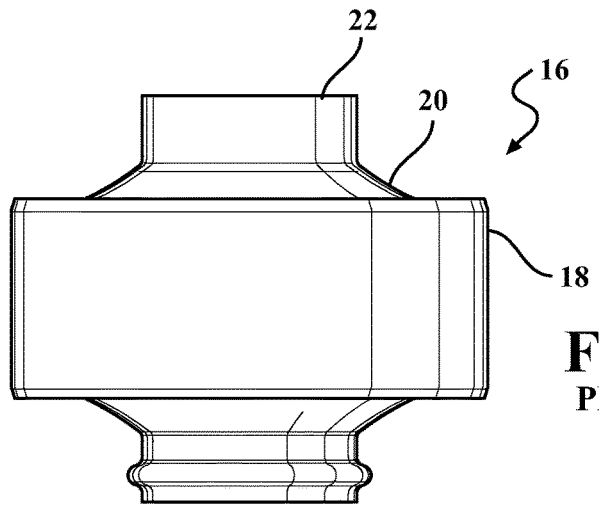
FIG. 2A is a front elevation view of a bushing assembly from the control arm body of FIG. 1.
Figure 2B:
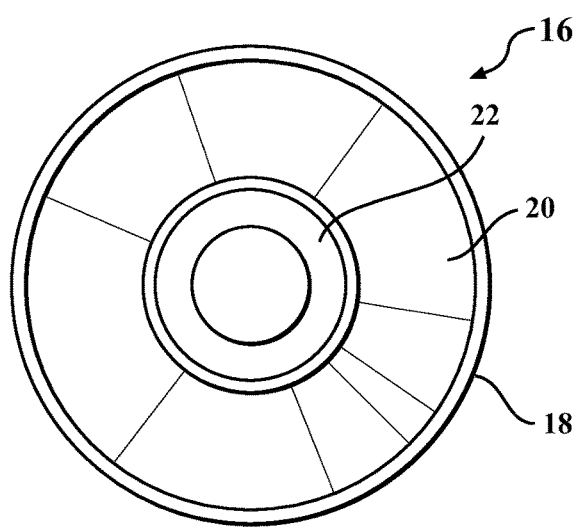
FIG. 2B is a top elevation view of the bushing assembly of FIG. 2A.
Figure 2C:
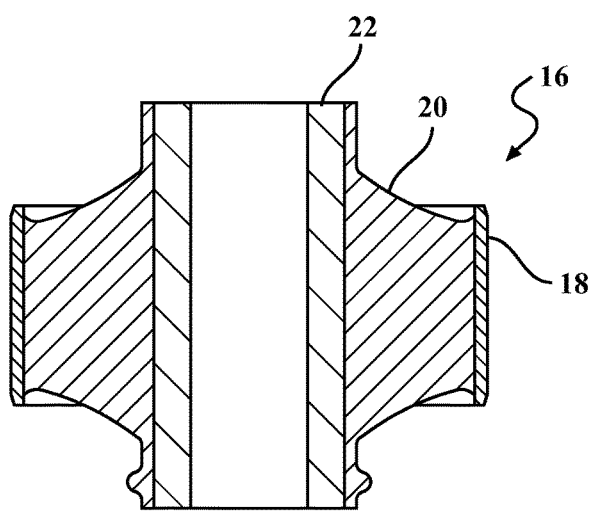
FIG. 2C is a cross-sectional view of the bushing assembly of FIG. 2A.

Referring back to FIG. 1, a zerk fitting 68 is located at one end of the bolt 40, and the bolt 40 has an internal passage 70 for conveying a lubricant, such as grease, from the zerk fitting 68 to the stud ball 52. Specifically, the internal passage 70 extends from an end of the bolt 40 to a side surface of the bolt 40 in a middle region of the bolt 40. The stud ball 52 also has a channel 71 which extends from an open bore of the stud ball 52 to the outer surface 56 for channeling the lubricant from the internal passage 70 of the bolt 40 to the outer surface 56 for reducing friction between the stud ball 52 and the housing 38. Since the zerk fitting 68 is located on an end of the bolt 40, it is accessible, even when the control arm assembly 24 (shown in FIG. 3) is installed in a vehicle. Accordingly, the ball joint assembly 30 may be re-lubricated (or serviced) without disassembly of the vehicle suspension system to access the ball joint assembly 30.

Referring now to FIGS. 8-10, one open end of the housing 38 includes a passage which is shaped for guiding the stud ball 52 (shown in FIGS. 11 and 12) into the spherical cavity 50 of the bearing 46. The passage extends axially from one of the open ends to the spherical cavity 50 and includes a pair of slots 72. As shown in FIG. 9, when viewed from above, the passage is generally oval in shape with a pair of long sides and a pair of curved sides. The long sides are spaced from one another by a distance that is greater than the distance between the truncated top 58 and the truncated bottom 60 of the stud ball 52 (shown in FIGS. 11 and 12).

Figure 13:
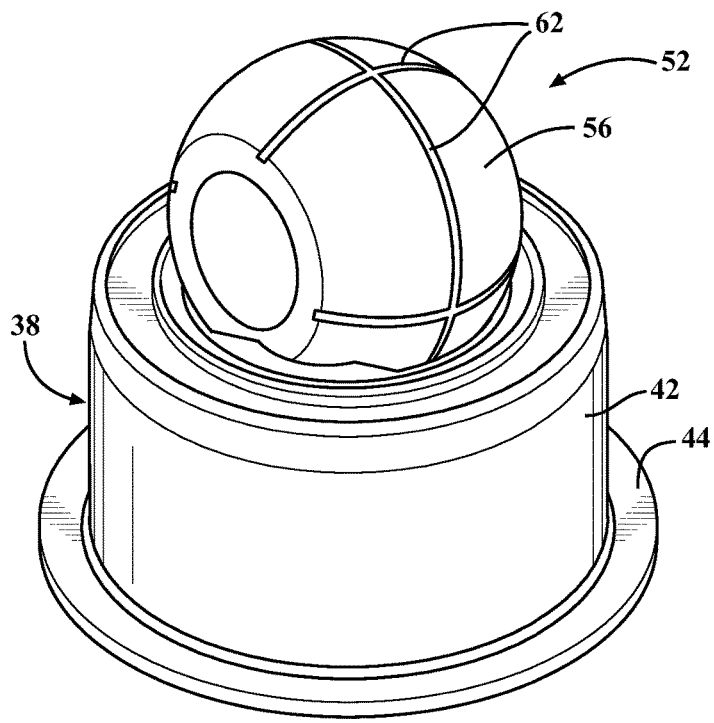
FIG. 13 is an isometric view of the stud ball of FIG. 11 being inserted into the housing of FIG. 8.

As shown in FIG. 13, insertion of the stud ball 52 into the spherical cavity of the bearing through the passage is very quick and requires no special tools. The process simply involves aligning the truncated top 58 and the truncated bottom 60 of the stud ball 52 with the long sides of the passage on an upper face of the housing 38 and feeding or guiding the stud ball 52 through the opening. Next, the stud ball 52 is rotated by 90 degrees to the orientation shown in FIG. 4, thereby trapping the stud ball 52 in the spherical cavity of the bearing 46. Once the stud ball 52 is captured within the spherical cavity of the bearing 46, the sleeves 54 may then be pressed fit into connection with the stud ball 52. This assembly process is very quick and may be accomplished with reduced labor and at a lower expense than other known ball joints.

As shown in FIGS. 4-6, an open space 74 is created between the protrusions 63 of the sleeves 54 and which extends annularly around the bolt 40, and this open space is axially aligned with the opening of the internal passage 70 on the side surface of the bolt 40. This open space 74 allows the lubricant to flow from the internal passage 70 of the bolt 40 and into the channel 71 of the stud ball 52 for lubricating the outer surface of the stud ball 52. That is, the bolt 40 and the stud ball 52 do not have to be rotationally aligned with one another during assembly to allow the lubricant to pass from the internal passage 70 of the bolt and into the channel 71 of the stud ball 52.

Another aspect of the present invention provides for a method of making a ball joint assembly 30 for a control arm assembly 24. The exemplary method includes the step of inserting a stud ball 52 with a truncated top 58 and a truncated bottom 60 into a cavity 50 of a bearing 46. The method continues with the step of rotating the stud ball 52 within the cavity 50 of the bearing 46 to establish sliding contact between an outer surface 56 of the stud ball 52 and a curved bearing surface 48 of the bearing 46. The method proceeds with the step of engaging sleeves 54 with the truncated top 58 and the truncated bottom 60 of the stud ball 52 after the stud ball 52 has been rotated within the cavity 50 of the bearing 46. The method may further include the step of inserting a fastener, such as a bolt 40, through an inner bore of the stud ball 52. The bolt 40 is provided with an internal passage 70 which extends from one end of the bolt 40 to a side surface of the bolt 40. The sleeves 54 have protrusions 64 which are spaced axially from one another in the inner bore of the stud ball 52 to present an open space 74 for receiving the lubricant from the internal passage 70 of the bolt 40. The stud ball 52 preferably has a channel 71 for conveying the lubricant from the open space 74 to the outer surface 56 and at least one groove 62 for distributing the lubricant around the outer surface 56.

Obviously, many modifications and variations of the present invention are possible in light of the above teachings and may be practiced otherwise than as specifically described while within the scope of the appended claims.

What is claimed is:

1. A ball joint assembly for a control arm of a vehicle suspension system, comprising:
    a housing;
    a bearing having an opening that extends along a first axis between opposite axial ends and said bearing having a curved bearing surface which surrounds a generally spherical ball receiving area;
    a stud including a stud ball and a pair of sleeves;
    said stud ball having a curved outer surface and an inner bore that extends along a second axis from a truncated top to a truncated bottom;
    said stud ball being positioned within said ball receiving area of said bearing such that said curved outer surface is in sliding contact with said curved bearing surface of said bearing to allow said bearing and housing to rotate relative to said stud;
    said opening of said bearing presenting a non-circular passage which extends from said ball receiving area to one of said axial ends and wherein said opening presents a pair of diametrically opposed slots that are shaped to allow said ball stud to pass through said passage when said second axis of said ball stud is oriented perpendicularly to said first axis of said bearing;
    a fastener which is receivable within said inner bore of said stud for connecting said stud with a frame of a vehicle;
    said fastener including an internal passage which extends from an end of said fastener to a side surface of said fastener and said stud ball having a channel which extends from said inner bore to said outer surface for allowing lubrication of said ball joint assembly while said ball joint assembly is installed in the vehicle suspension system;
    each of said sleeves of said stud extending along said first axis from a first end area that is received in said stud ball to a second end area and having an outer surface which tapers radially inwardly from said second end area to said first end area; and
    a pair of dust boots, each of said dust boots being sealed against said housing and being sealed against said second end area of one of said sleeves.

2. The ball joint assembly as set forth in claim 1 wherein said sleeves include protrusions that are received within said inner bore of said stud ball and wherein said protrusions of said sleeves are spaced axially from one another within said inner bore of said stud ball to present an open space which extends around said fastener when said fastener is received within said inner bore of said stud.

3. The ball joint assembly as set forth in claim 1 wherein said stud ball further includes at least one groove for distributing lubricant around said outer surface of said stud ball.

4. The ball joint assembly as set forth in claim 1 wherein said bearing and said housing are formed as a single monolithic piece.

5. The ball joint assembly as set forth in claim 1 wherein said fastener is a bolt.

6. A method of making a ball joint assembly for a control arm of a vehicle suspension, comprising the steps of:
    preparing a housing and a bearing with an opening which extends along a first axis, the opening having a non-circular passage with a pair of diametrically opposed slots and extending to a generally spherical ball receiving area;
    preparing a stud ball that has a curved outer surface and an inner bore that extends along a second axis from a truncated top to a truncated bottom;
    aligning the stud ball relative to the bearing such that the second axis extends generally perpendicularly to the first axis;
    inserting the stud ball through the passage of the bearing and into the ball receiving area;
    rotating the stud ball within the ball receiving area of the bearing to align the first and second axes and to establish sliding contact between the curved outer surface of the stud ball and a curved bearing surface of the bearing;

engaging sleeves with the truncated top and truncated bottom of the stud ball after the stud ball has been rotated within the cavity of the bearing wherein each of the sleeves extends along the first axis form a first end area that is received in the stud ball to a second end area and wherein each sleeve has an outer surface which tapers radially inwardly from said second end area to said first end area; and sealing a pair of dust boots against the housing and against the second end areas of the sleeves.

7. The method as set forth in claim 6 further including the step of inserting a fastener through the inner bore of the stud ball.

8. The method as set forth in claim 7 wherein the fastener is provided with an internal passage which extends from one end of the fastener to a side surface of the fastener.

9. The method as set forth in claim 8 wherein the sleeves include protrusions which extend into the inner bore of the stud ball and are spaced from one another to present an open space which surrounds the fastener for receiving lubricant from the internal passage of the fastener.

10. The method as set forth in claim 9 wherein the stud ball has a channel for conveying the lubricant from the open space to the outer surface of the stud ball.

11. The method as set forth in claim 10 wherein the outer surface of the stud ball has at least one groove for distributing the lubricant around the outer surface.

* * * * *